(12) United States Patent
Dardas et al.

(10) Patent No.: US 8,795,588 B2
(45) Date of Patent: Aug. 5, 2014

(54) SYSTEMS AND METHODS FOR REMOVAL OF CONTAMINANTS FROM FLUID STREAMS

(75) Inventors: Zissis A. Dardas, Worcester, MA (US); Norberto O. Lemcoff, Simsbury, CT (US); Susan D. Brandes, South Windsor, CT (US); Leland G. Brandes, legal representative, McMurray, PA (US); Stephen O. Hay, Tolland, CT (US); Timothy N. Obee, South Windsor, CT (US); Foster P. Lamm, South Windsor, CT (US); Albert T. Pucino, Glastonbury, CT (US); Joseph J. Sangiovanni, West Suffield, CT (US); Thomas Henry Vanderspurt, Glastonbury, CT (US); Wayde R. Schmidt, Pomfret Center, CT (US); Treese Hugener-Campbell, Coventry, CT (US)

(73) Assignee: Carrier Corporation, Farmington, CT (US)

( * ) Notice: Subject to any disclaimer, the term of this patent is extended or adjusted under 35 U.S.C. 154(b) by 1505 days.

(21) Appl. No.: 12/302,651

(22) PCT Filed: May 31, 2007
(Under 37 CFR 1.47)

(86) PCT No.: PCT/US2007/012854
§ 371 (c)(1),
(2), (4) Date: Dec. 27, 2010

(87) PCT Pub. No.: WO2007/143041
PCT Pub. Date: Dec. 13, 2007

(65) Prior Publication Data
US 2011/0117002 A1    May 19, 2011

Related U.S. Application Data

(60) Provisional application No. 60/810,024, filed on Jun. 1, 2006, provisional application No. 60/810,022, filed on Jun. 1, 2006.

(51) Int. Cl.
*A61L 9/00* (2006.01)

(52) U.S. Cl.
USPC .................................. 422/4; 422/122

(58) Field of Classification Search
USPC ...................... 422/120, 122, 4
See application file for complete search history.

(56) References Cited

U.S. PATENT DOCUMENTS 5,006,248 A    4/1991 Anderson et al.
5,668,076 A    9/1997 Yamagushi et al.
(Continued)

FOREIGN PATENT DOCUMENTS

CN    2662130 Y    12/2004
CN    1758949 A    4/2006
(Continued)

OTHER PUBLICATIONS

Dagan, Guela and Tomkiewicz, Micha, "TiO2 Aerogels for Photocatalytic Decontamination of Aquatic Environments," The Journal of Physical Chemistry, vol. 97, No. 49, pp. 12651-12655, American Chemical Society (Dec. 9, 1993).

(Continued)

*Primary Examiner* — Jill Warden
*Assistant Examiner* — Joye L Woodard
(74) *Attorney, Agent, or Firm* — Cantor Colburn LLP

(57) ABSTRACT

A contaminant removal system is disclosed for selectively removing contaminants from a fluid stream. The contaminant removal system has a catalytic reactor of the type that is susceptible to deactivating agents, and is configured to remove contaminants from a fluid stream. The contaminant removal system has a first adsorbent device positioned upstream, with respect to the fluid stream direction, of the catalytic reactor, that is configured to chemically bind with and remove the deactivating agents from the fluid stream. The contaminant removal system can have a second adsorbent device positioned downstream, with respect to the fluid stream direction, of the catalytic reactor. The second adsorbent device is configured to remove undesirable byproducts that may be generated when the catalytic reactor removes contaminants from the fluid stream.

18 Claims, 10 Drawing Sheets

(56) References Cited

U.S. PATENT DOCUMENTS

| | | | |
|---|---|---|---|
| 5,718,878 | A | 2/1998 | Zhang |
| 5,933,702 | A | 8/1999 | Goswami |
| 6,063,343 | A | 5/2000 | Say et al. |
| 6,121,191 | A | 9/2000 | Komatsu et al. |
| 6,136,203 | A | 10/2000 | Butters et al. |
| 6,156,211 | A | 12/2000 | Gonzalez-Martin et al. |
| 6,221,259 | B1 | 4/2001 | Kittrell |
| 6,238,631 | B1 | 5/2001 | Ogata et al. |
| 6,241,856 | B1 | 6/2001 | Newman et al. |
| 6,296,823 | B1 * | 10/2001 | Ertl et al. ................... 422/122 |
| 6,531,100 | B1 | 3/2003 | Ogata et al. |
| 6,685,909 | B2 | 2/2004 | Elder et al. |
| 6,890,373 | B2 | 5/2005 | Nemoto et al. |
| 6,908,698 | B2 | 6/2005 | Yoshida et al. |
| 2002/0005145 | A1 | 1/2002 | Sherman |
| 2002/0050450 | A1 | 5/2002 | Newman et al. |
| 2002/0150527 | A1 * | 10/2002 | Rossin ................... 423/240 S |
| 2003/0113246 | A1 | 6/2003 | Saitou et al. |
| 2003/0150707 | A1 | 8/2003 | Carmignani et al. |
| 2003/0202932 | A1 | 10/2003 | Elder et al. |
| 2004/0144416 | A1 | 7/2004 | Wang et al. |
| 2004/0202723 | A1 | 10/2004 | Yu et al. |
| 2004/0241427 | A1 | 12/2004 | Zhu et al. |
| 2005/0053515 | A1 | 3/2005 | Yates et al. |
| 2005/0129589 | A1 | 6/2005 | Wei et al. |
| 2005/0129591 | A1 | 6/2005 | Wei et al. |
| 2005/0181937 | A1 | 8/2005 | Karvinen et al. |
| 2005/0233899 | A1 | 10/2005 | Anzaki et al. |
| 2006/0000352 | A1 | 1/2006 | Tower et al. |
| 2006/0104894 | A1 | 5/2006 | Daoud et al. |
| 2006/0228275 | A1 | 10/2006 | Rutman et al. |
| 2007/0042906 | A1 | 2/2007 | Pitts et al. |

FOREIGN PATENT DOCUMENTS

| | | |
|---|---|---|
| DE | 19905546 A1 | 8/1999 |
| EP | 0978494 A1 | 2/2000 |
| JP | 2000102596 A | 4/2000 |
| JP | 2000239047 A | 9/2000 |
| JP | 2001129412 A | 5/2001 |
| JP | 2002085967 A | 3/2002 |
| JP | 2006021494 A | 1/2006 |
| WO | WO2004112958 A1 | 12/2004 |
| WO | WO2006065491 A2 | 6/2006 |
| WO | WO2007143042 A2 | 12/2007 |

OTHER PUBLICATIONS

Extended EP Search Report of the European Patent Office in European Application No. 07809257.4 dated Apr. 25, 2012, 6 pages.

M. Hirano et al., "Direct Formation of Iron (III)-Doped Titanium Oxide (Anatase) by Thermal Hydrolysis and Its Structural Property", from J. of the Amer. Ceramic Soc. 87(1):35-41 (2004).

S. Mahanty et al., "Effect of Sn Doping on the structural and optical properties of sol-gel TiO thin films", from J. of Crystal Growth 216(1):77-81 (2004).

Masatoshi Natamura, "Hydrophilic and photocatalytic properties of the SiO2/TiO2 double layers", Thin Solid Films 496 (2006) 231-135. Published Online: Oct. 3, 2005.

Ohno et al. "Morphology of a Tio2 Photocatalyst (Degussa, P-25) Consisting of Anatase and Rutile Crystalline Phases", Journal of Catalysis 203, 82-86 (2001).

International Search Report for International Application No. PCT/US2007/012813 mailed Nov. 9, 2007, 3 pages.

Written Opinion for International Application No. PCT/US2007/012813 mailed Nov. 9, 2007, 5 pages.

International Search Report for International Application No. PCT/US2007/012820 mailed Nov. 7, 2009.

Written Opinion for International Application No. PCT/US2007/012820 mailed Nov. 7, 2009.

International Preliminary Report on Patentability for International Application No. PCT/US2007/012855 dated Apr. 14, 2009, 8 pages.

International Search Report for International Application No. PCT/US2007/012855 mailed Nov. 27, 2007, 1 page.

Written Opinion for International Application No. PCT/US2007/012855 mailed Nov. 27, 2007, 4 pages.

A. Sclafani et al., "Influence of Silver Deposits on the Potocatalytic Activity of Titania", J Catalysis 168 (1): 117-120 (1997).

Sun, R., A. Nakajima, T. Watanabe, and K. Hashimoto, "Decomposition of gas-phase octamethyltrisiloxane on TiO2 thin film photocatalysts—catalytic activity, deactivation, and regeneraton," Journal of Photochemistry and Photobiology A: Chemistry 154 (2003), pp. 203-209.

Wang, Chao, Li, Qing and Wang, Ruoding, "Synthesis and characterization of mesoporous iron-doped Ti02," Journal of Materials Science 39, pp. 1899-1901, Kluwer Academic Publishers (2004).

Z. Zhang et al., "Role of Particle Size in Nanocrystalline TiO2-Based Photocatalysts", J. Phys. Chem. B 102, 10871-10878 (1998).

Extended European Search Report, Supplementary European Search Report, and European Search Opinion for International Application No. PCT/US2007/012855, Oct. 31, 2011, 6 pages.

Official Search Report of the Patent Cooperation Treaty in counterpart foreign Application No. PCT/US2007/012854 filed May 31, 2007.

A.T. Hodgson et al., Evaluation of Ultra-Violet Photocatalytic Oxidation (UVPCO) for Indoor Air Applications: Conversion of Volatile Organic Compounds at Low Part-per-Billion Concentrations, Sep. 30, 2005. Lawrence Berkeley National Library. Paper LBNL-58936. http://repositories.cdlib.org/lbnI/LBNL-58936.

C.S. Turchi et al., Benchscale Testing of Photocatalytic Oxidation (PCO) to Destroy Volatile Organic Compound (VOC) Emissions, Technology Transfer #95042791A-ENG, SEMATECH, Apr. 28, 1995.

E.J. Wolfrum et al., Destruction of Volatile Organic Compound (VOC) Emissions by Photocatalytic Oxidation (PCO): Final Report (ESHCOO3). Technology Transfer # 97013236A-ENG, SEMATECH, Feb. 28, 1997.

J. Peral et al., Heterogeneous Photocatalytic Oxidation of Gas-Phase Organics for Air Purification: Acetone, 1-Butanol, Butyraldehyde, Formaldehyde, and M-Xylene Oxidation, J Catalysis 136, 554-565 (1992).

R.I. Bickley et al, Photoadsporption and Photocatalysis at Rutile Surfaces II. Photocatalytic Oxidation of Isopropanol, J Catalysis 31, 398-407 (1973).

E. Piera et al., Ti02 Deactivation During Gas-Phase Photocatalytic Oxidation of Ethanol, Catalysis Today 76, 259-270 (2002).

T.N. Obee et al., The Estimation of Photocatalytic Rate Constants Based on Molecular Structure Extending to Multi-Component Systems, J. Advanced Oxidation Technol., vol. 4, No. 2, 147-152 (1999).

J. Peral et al., Photocatalyst Deactivation: Oxidation of Decamethyl-Tetrasiloxane, Pyrrole, Indole and Dimethyl Sulfide, Photocatalytic Purification and Treatment of Water and Air, pp. 741-745, Elsevier (1993).

H. Chen et al., Effect of Silicone Concentration in Deposition of Silicon-Dioxide in the Corona Discharge of Electrostatic Air Cleaners, Proceedings of the 1999 Fall Topical Conference, pp. 203-210, American Filteration and Separations Society, 1999.

J.T. Hanley et al., Improved Test Methods for Electronic Air Cleaners, Indoor Air 2002, Proceedings of the 8th International Conference on Indoor Air Quality and Climate, Monterey, CA, 2002.

J.L. Perry et al., Air Purification in Closed Environments: Overview of Spacecraft Systems, 2002 NBC Defence Collective Protection Conference, Orlando, FL, Oct. 2002.

P. Tower, New Technology for Removal of Siloxanes in Digester Gas Results in Lower Maintenance Costs and Air Quality Benefits in Power Generation Equipment, WEFTEC 03, 78th Annual Technical Exhibition and Conference, Oct. 11-15, 2003.

Extended EP Search Report of the European Patent Office in counterpart foreign Application No. 07809253.3 dated Dec. 2, 2011, including machine translation of JP2006021494A, 24 pages.

Official Search Report and Written Opinion of the European Patent Office in counterpart foreign Application No. 07795551.6, filed May 31, 2007.

\* cited by examiner

SYSTEMS AND METHODS FOR REMOVAL OF CONTAMINANTS FROM FLUID STREAMS

CROSS-REFERENCE TO RELATED APPLICATION(S)

This application claims the benefit of PCT Application No. PCT/US2007/012854 filed May 31, 2007 entitled SYSTEMS AND METHODS FOR REMOVAL OF CONTAMINANTS FROM FLUID STREAMS, which claims the benefit of U.S. Provisional Application No. 60/810,024, filed Jun. 1, 2006 entitled SYSTEM FOR REMOVAL OF CONTAMINANTS FROM AIR and U.S. Provisional Application No. 60/810,022, filed Jun. 1, 2006 entitled SILICON MITIGATION OR REMOVAL SYSTEM.

BACKGROUND OF THE INVENTION

1. Field of the Invention

The present disclosure relates to systems and methods for removal of contaminants from fluid streams. In particular, the present disclosure relates to systems and methods for the removal of volatile organic compounds from fluid streams.

2. Description of Related Art

The air within homes, office buildings, and other enclosed structures is often more polluted than outdoor air, especially in highly urbanized areas.

In some instances, the indoor air can include volatile organic compounds (VOCs) and/or semivolatile organic compounds (SVOCs). VOCs are organic chemical compounds with high enough vapor pressures, under normal conditions, to significantly vaporize and enter the atmosphere. SVOCs are organic compounds with typical vapor pressures between $10^{-2}$ and $10^{-8}$ kPa at room temperature, so that they exist both in the gas phase and the condensed phase. These organic compounds are emitted as gases from certain solids or liquids, including a number of items commonly found around a home or office, such as paint, furniture, building materials, office equipment, and cleaning supplies.

Buildings may utilize air purification systems to improve the quality of indoor air thus enabling the building operator to decrease ventilation and create an improved environment. The quality of indoor air is achieved through air purification using either aerosol removal or gaseous contaminant removal technologies. Photocatalysis is a proven technology for removal of gaseous airborne substances such as VOCs from the air supply. Photocatalytic air purifiers utilize a substrate or cartridge containing a photocatalyst, usually a titanium oxide based material, that interacts with airborne oxygen and water molecules to form hydroxyl radicals when placed under an appropriate light source, typically a UV light source. The hydroxide radicals then attack the contaminants and initiate the oxidation reaction that converts them into less harmful compounds, such as water and carbon dioxide. A commonly used photocatalyst is titanium dioxide, otherwise referred to as titania. Degussa P25 titania and tungsten dioxide grafted titania catalysts such as tungsten oxide on P25 have been found to be especially effective at removing organic contaminants under UV light sources.

One well known phenomenon that limits the effectiveness of photocatalytic oxidation (PCO) air purifiers is deactivation of the photocatalyst. Deactivation can occur reversibly or irreversibly and the extent and scope of the deactivation depends on the system configuration, including light intensity at the catalyst surface, the amount and configuration of the catalyst, and conditions in the ambient environment. Currently available systems have been found to exhibit a significant loss in catalytic ability when they are overwhelmed by organic contaminants such as ethanol, iso-propanol and other contaminants having a high affinity for the catalytic surface. Catalytic ability also decreases when the photocatalyst is challenged with a gaseous compound that, when oxidized, forms a compound or moiety that blocks an active site on the catalyst permanently unless acted on by an outside agent.

Compounds which contain only hydrogen, carbon and oxygen atoms usually only cause reversible deactivation, which only has a short term impact on the operation of the air purifier. However, if the VOC concentrations are high enough with the UV light on, or if the VOC concentrations last long enough with the UV light off, the photocatalysts are not able to interact with water to create sufficient hydroxyl radicals to keep active sights available for further reaction. The contaminants then may react with each other to form a varnish, which occupies the photocatalyst sites and blocks the ability of the photocatalysts to oxidize the contaminants. This or any type of permanent deactivation can lead to a significant expense for the operator of the air purification system due to the labor and equipment costs associated with cleaning and/or replacing the photocatalyst.

Another recently discovered deactivation route is caused by the mineralization of silicon-containing volatile compounds, especially the class of compounds known as siloxanes. Where as the aggregate amount of VOCs in air typically ranges from 100 to 1000 parts per billion by volume, siloxane concentrations can be two or more orders of magnitude lower. These siloxanes arise primarily from the use of certain personal care products or dry cleaning fluids, although they can also arise from the use of silicone caulks, adhesives and similar materials. However, when these silicon-containing compounds are oxidized, they form non-volatile silicon dioxide or hydrated silicon dioxide that deactivates the photocatalyst. This deactivation can be by one or more means such as relatively direct physical blocking of the active sites, blocking of the pores in the photocatalytic coating, or blocking the interaction of the VOCs with the active agent.

In the removal of contaminants from air, the oxidation of certain species can generate undesirable byproducts, or the contaminant itself can have a negative effect on the performance of the photocatalytic unit. Thus, UV/PCO air purification alone is not sufficient to reduce the concentrations of VOCs in the air within desired limits.

SUMMARY OF THE INVENTION

The present disclosure provides a contaminant removal system for selectively removing contaminants from a fluid stream. The contaminant removal system has a catalytic reactor of the type that is susceptible to deactivating agents. The catalytic reactor is configured to remove contaminants from a fluid stream. The contaminant removal system has a first adsorbent device positioned upstream, with respect to a direction of the fluid stream, of the catalytic reactor, that is configured to remove the deactivating agents from the fluid stream.

DETAILED DESCRIPTION OF THE INVENTION

The present disclosure provides a contaminant removal system that eliminates both the production of harmful byproducts by photocatalytic oxidation, and byproducts that may lead to the deactivation of the photocatalyst.

The present disclosure provides a contaminant removal system for selectively removing contaminants from a fluid stream. The contaminant removal system provides a system consisting of one or more adsorbent devices for controlling the concentrations of harmful contaminants in a fluid, especially when these contaminants cannot be adequately converted to harmless compounds by a photocatalytic oxidation reactor. Possible applications include air purification and air handling systems in buildings and vehicles. Preferably, the contaminant removal system will remove substantially all harmful contaminants, deactivating agents and byproducts from the fluid, including heteroatoms, siloxanes, silanes, nitrogen, phosphorous, sulfur, and other types of volatile organic compounds (VOCs).

Figure 1:
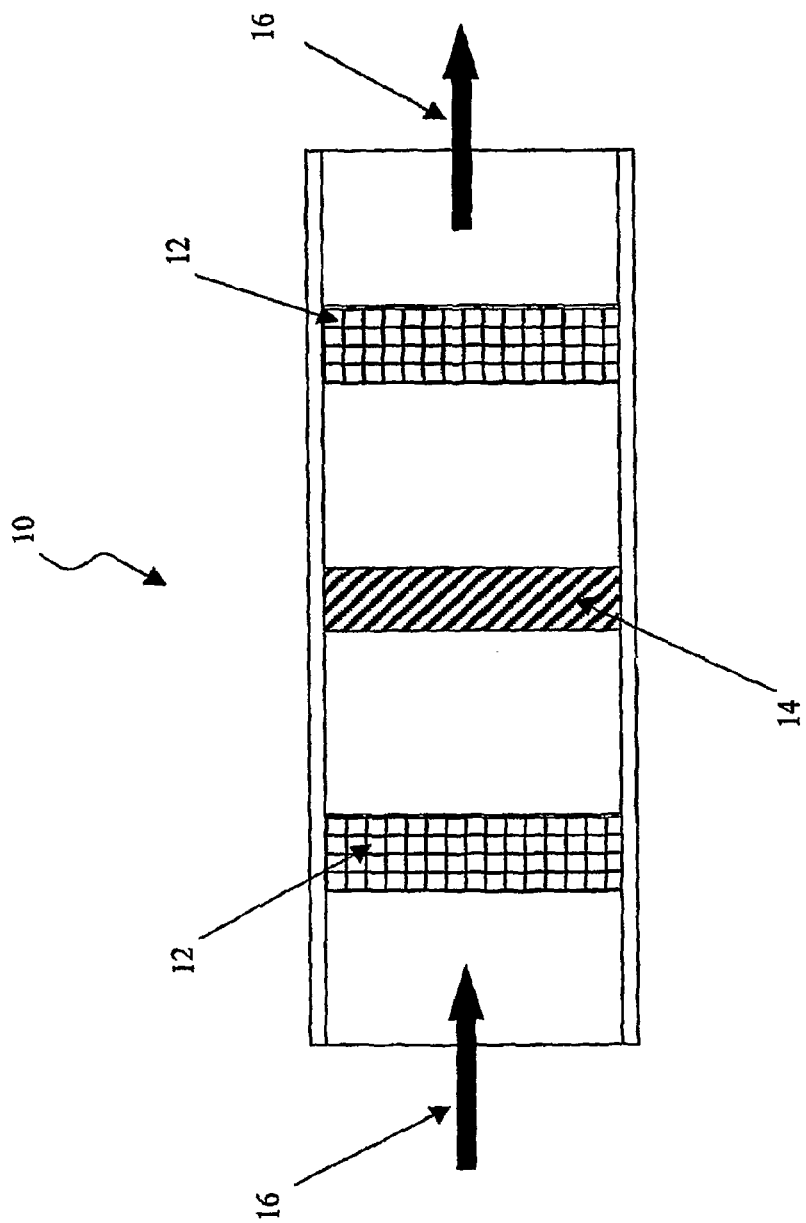
FIG. 1 is a sectional view of an exemplary embodiment of a contaminant removal system according to the present disclosure.

Referring to FIG. 1, an exemplary embodiment of the contaminant removal system 10 of the present disclosure is illustrated. Contaminant removal system 10 includes one or more adsorbent devices 12 and one or more catalytic reactors 14 for removing contaminants from a fluid stream 16 or more specifically, an air stream. In the embodiment shown in FIG. 1, contaminant removal system 10 comprises two adsorbent devices 12 and one catalytic reactor 14. Preferably, catalytic reactor 14 is a photocatalytic oxidation (PCO) device of the type that is susceptible to deactivating agents. More preferably, catalytic reactor 14 is an ultraviolet photocatalytic oxidation device (UV/PCO). Adsorbent devices 12 may be located upstream or downstream of catalytic reactor 14. Preferably, one adsorbent device 12 is located upstream and one adsorbent device 12 is located downstream of catalytic reactor 14. In one exemplary embodiment, fluid stream 16 enters contaminant removal device 10 and passes through an upstream adsorbent device 12, through the photocatalytic oxidation device 14, and finally through a downstream adsorbent device 12 before exiting contaminant removal system 10. As used herein, the terms "upstream" and "downstream" are used with respect to the direction of flow of fluid stream 16.

Advantageously, adsorbent devices 12 are capable of selectively removing deactivating agents, undesirable byproducts and VOCs, including heteroatoms, siloxanes, and silanes, from fluid stream 16. Adsorbent devices 12 include an adsorbent material that has preferential attraction of silicon-containing volatile compounds and/or that are reactive toward the organosilicon compounds chemically binding them to its surface. In the preferred embodiment, the adsorbent materials attract the organic compounds by physical forces. Typical examples of these types of adsorbent materials are impregnated and non-impregnated activated carbons, porous graphite, silicas, silica gels, clays, zeolites, and hydrophobic adsorbents. In one embodiment, the selective removal of deactivation agents is accomplished using activated carbons in adsorbent devices 12. The activated carbons may be in the form of pellets, granules, fibers, fabrics, cloths, or felts, and may be impregnated or non-impregnated. Examples of activated carbons suitable for use in adsorbent device 12 include Ahlstrom K822-300 and Ahlstrom K808-500, each having a tri-layer construction with a granule layer sandwiched between two mesh layers. Other possible activated carbons for use in adsorbent devices 12 include Kynol ACC 5092-20 (fabric), Kynol ACN-210-15 (felt), Kynol ACN-211-15 (felt), Kynol ACN 303-15 (felt), and Cameron SG6 (pellets). Examples of impregnated activated carbons that can be used in adsorbent devices 12 include Cameron G6-NH (pellets) and Cameron SG-PH (pellets). In addition, adsorbent devices 12 may utilize porous graphite, silica gel, clays, zeolites, and hydrophobic adsorbents. Hydrophobic adsorbents are preferably used in examples where fluid stream 16 is a high humidity air stream.

In another embodiment, the adsorbent material of adsorbent devices 12 has chemical interaction with the organic compounds. These adsorbent materials may be intrinsically reactive, like a non-volatile acid or base, or require activation like a photocatalyst. These materials can be coated on the filter medium to protect it from the harmful effects of UV radiation. Acidic materials of interest include heteropoly-molybdic acids, heteropoly-tungstic, heteropoly-niobic acids, heteropoly-vanadic acids, mixed heteropolyoxo acids, sulfated zirconias, silico-aluminates, alumino-silicates, aluminophosphates, silicoaluminophosphates, mesoporous oxides especially silicates, silicoaluminates, doped silicoaluminates, titanium oxides, manganese oxides, and compounds and mixtures of the foregoing.

In another embodiment, adsorbent devices 12 may be filter elements that include adsorption material. While the chemical attachment of the organic compounds on the adsorbent materials may start with physi-sorption (e.g., no chemical bonding), it progresses either at room temperature or under the influence of heat, microwaves or light, including UV light, towards a chemical bond. This bond requires atmospheric moisture to form. The adherence of the silicon compound to the fibers of the filter elements does not impact its effectiveness as a dust filter as the change in the filter diameter, even in the case of nano-fibers, is less than 1% and typically much less than 1%.

In another embodiment, the surface of the filter fibers may be treated with a material that makes them reactive toward organo-silicon compounds. In the removal of contaminants from air, the oxidation of certain species can generate undesirable byproducts, or the contaminant itself can have a negative effect on the performance of the photocatalytic unit. Thus, UV/PCO air purification alone is not sufficient to reduce the concentrations of VOCs in the air within desired limits.

Figure 2:
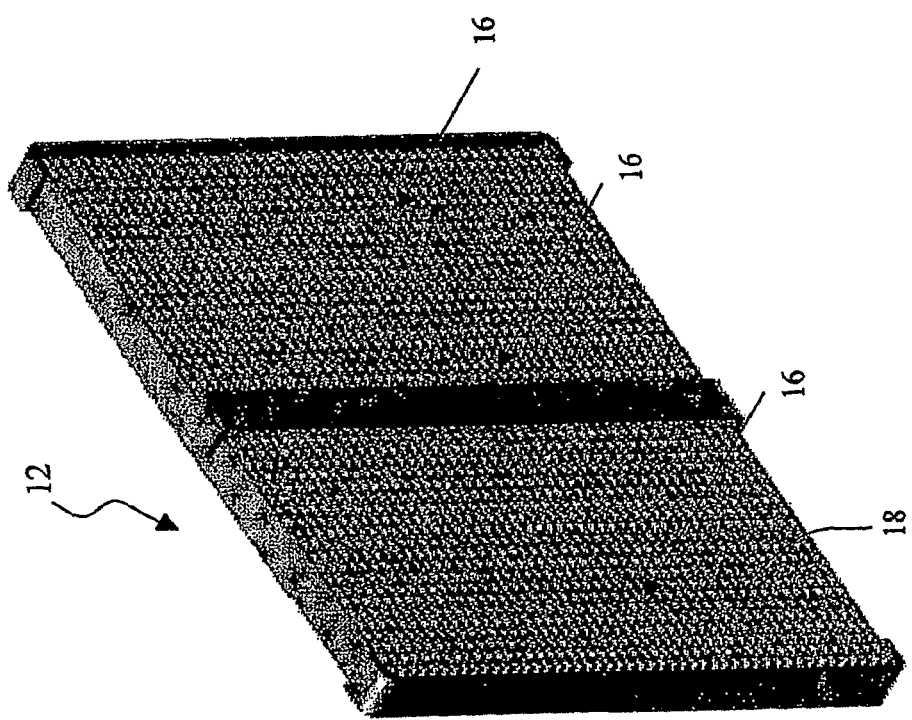
FIG. 2 is a perspective view of an exemplary embodiment of an adsorbent device of the contaminant removal system of FIG. 1.

Referring to FIG. 2, adsorbent device 12 comprises a honeycomb like structure, which provides a high surface to volume ratio, enabling efficient operation of adsorbent device 12 while maintaining a relatively low pressure drop as fluid stream 16 passes through the device. An exemplary embodiment of the honeycomb structure of adsorbent device 12 is illustrated in FIG. 2. The honeycomb structure is preferably comprised of aluminum. The direction of fluid stream 16 is preferably perpendicular to adsorbent device 12. The honeycomb structure of adsorbent device 12 preferably comprises cells 18. Cells 18 can be of any shape and size that provides a sufficient surface to volume ratio. The geometry of cells 18 can be of the corrugated type or of the triangular type. Alternatively, cells 18 may have a hexagonal, square, or trapezoidal geometry. Cells 18 preferably have a size between about 1.5 millimeters (mm) and about 26 mm and any subranges therebetween.

Figure 3:
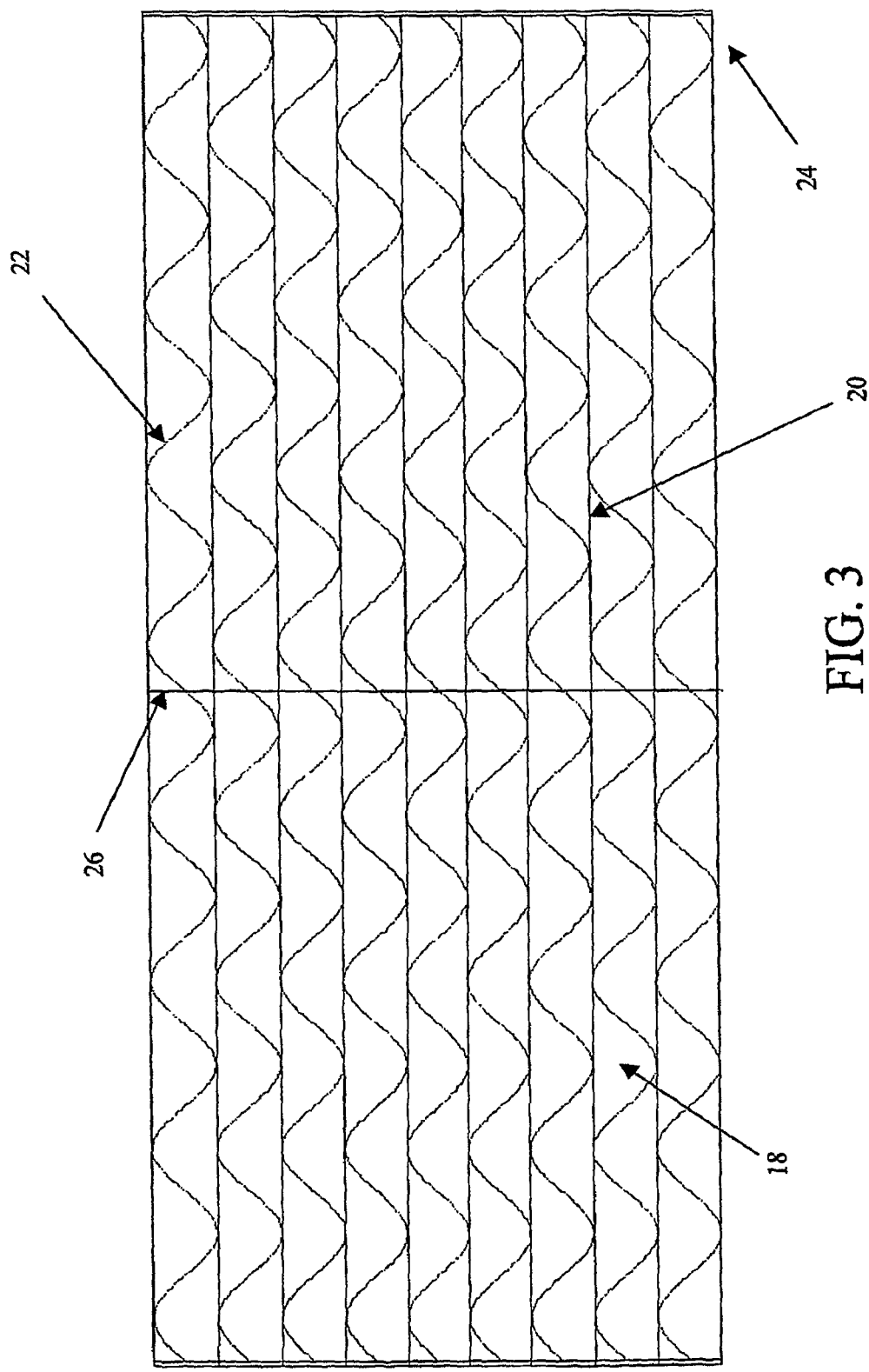
FIG. 3 is a sectional view of the adsorbent device of FIG. 2.

FIG. 3 illustrates another embodiment of the adsorbent device 12 wherein cells 18 are of the corrugated type. In this embodiment, adsorbent device 12 comprises alternating flat foils 20 and corrugated foils 22 surrounded by a frame 24. Foils 20, 22 are coated with one or more of the adsorbent materials described above. Flat foils 20 and corrugated foils 22 may be held together using one or more pins 26 (one shown). Alternatively, flat foils 20 and corrugated foils 22 can be welded together. Preferably, flat foils 20 and corrugated foils 22 of adsorbent device 12 are made of aluminum. Foils 20, 22 are preferably about 0.05 mm thick, with the distance between adjacent flat foils 20 preferably being about 3 mm.

In one exemplary embodiment, adsorbent device 12 is a packed bed. In another exemplary embodiment, adsorbent device 12 comprises microparticles embedded in a filter. In yet another embodiment, adsorbent device 12 comprises nanoparticles embedded in a filter. Additionally, adsorbent device 12 may comprise microparticles or nanoparticles coating a monolithic structure. In still another embodiment, adsorbent device 12 comprises microfibrous or nanofibrous materials that have the advantage of a fast uptake of contaminants.

Figure 4:
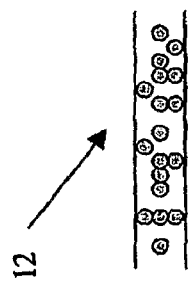
FIG. 4 is an exemplary embodiment of embedded microparticles or nanoparticles for use in the adsorbent device.

FIG. 4 illustrates a preferred embodiment of the adsorbent device 12 wherein the adsorbent device comprises microparticles or nanoparticles embedded in a filter.

Figure 5:
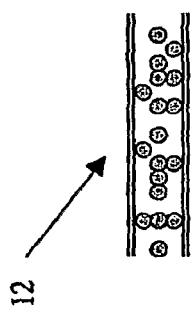
FIG. 5 is an exemplary embodiment of a tri-layer construction for use in the adsorbent device.

FIG. 5 illustrates a preferred embodiment of the adsorbent device 12 wherein the adsorbent device comprises a tri-layer construction with a granule layer sandwiched between two mesh layers.

Figure 6:
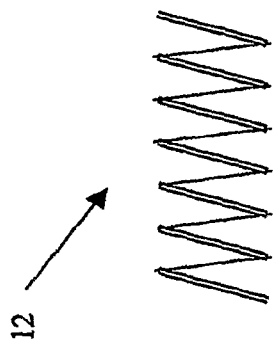
FIG. 6 is an exemplary embodiment of a pleated filter for use in the adsorbent device.

FIG. 6 illustrates a preferred embodiment of the adsorbent device 12 wherein the adsorbent device comprises a pleated filter.

In another exemplary embodiment, adsorbent device 12 comprises a monolithic wheel, that is a monolithic structure in the shape of a cylinder, the diameter of the cylinder being larger than the height of the cylinder. The wheel is divided into at least two sections. These sections can be equal in size, or alternatively, of unequal sizes. For example, one section may comprise a quarter of the area of the monolithic wheel, with the other section comprising the rest of the wheel. The wheel rotates about an axis running through the center of the wheel so that the adsorbent is exposed to the air stream for a period of time (equivalent to the size of one of the sections) and then is exposed to a regenerating gas for the remainder of the cycle.

In one preferred embodiment, adsorbent device 12 comprises a filter using an activated carbon felt, such as Kynol ACN 211-15, for the removal of hexamethyldisiloxane (HMDS). In this embodiment, adsorbent device 12 is positioned upstream of the catalytic reactor 14. Upon saturation, the filter of adsorbent device 12 is either replaced or regenerated. Preferably, the filter is regenerated by heating. The activated carbon felt preferably conducts electricity, which can be used to accelerate the regeneration.

Figure 7:
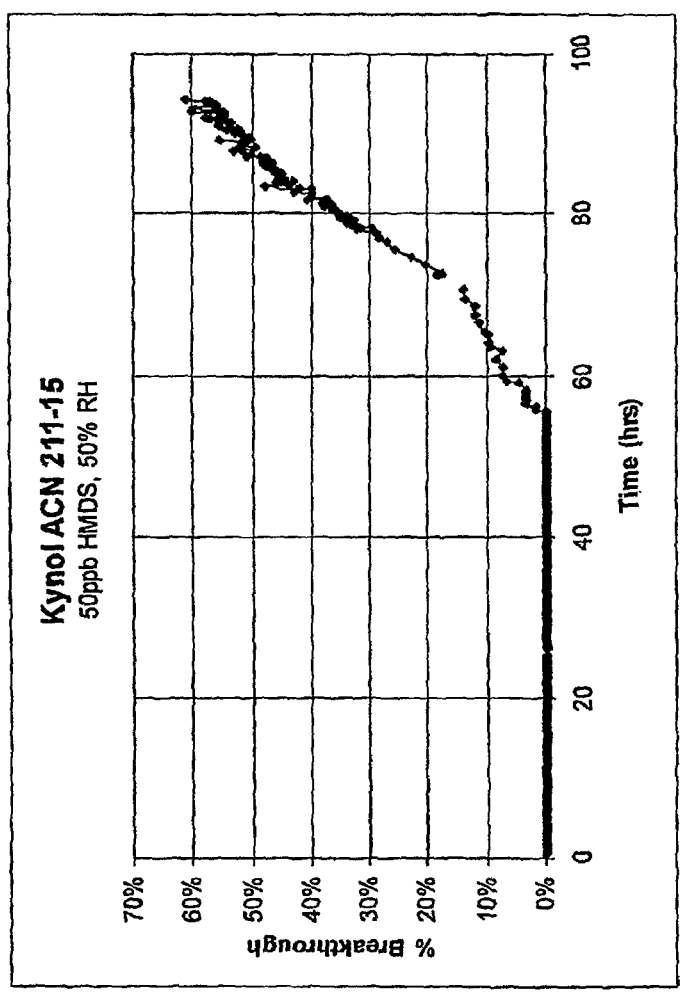
FIG. 7 shows the breakthrough curve for the adsorption of Hexamethyldisiloxane (HMDS) by Kynol felt ACN 211-15.

FIG. 7 shows the capacity of the adsorbent device 12 using the Kynol ACN 211-15 adsorbent to remove 50 ppb HMDS from an air stream with relative humidity at 50%.

Figure 8:
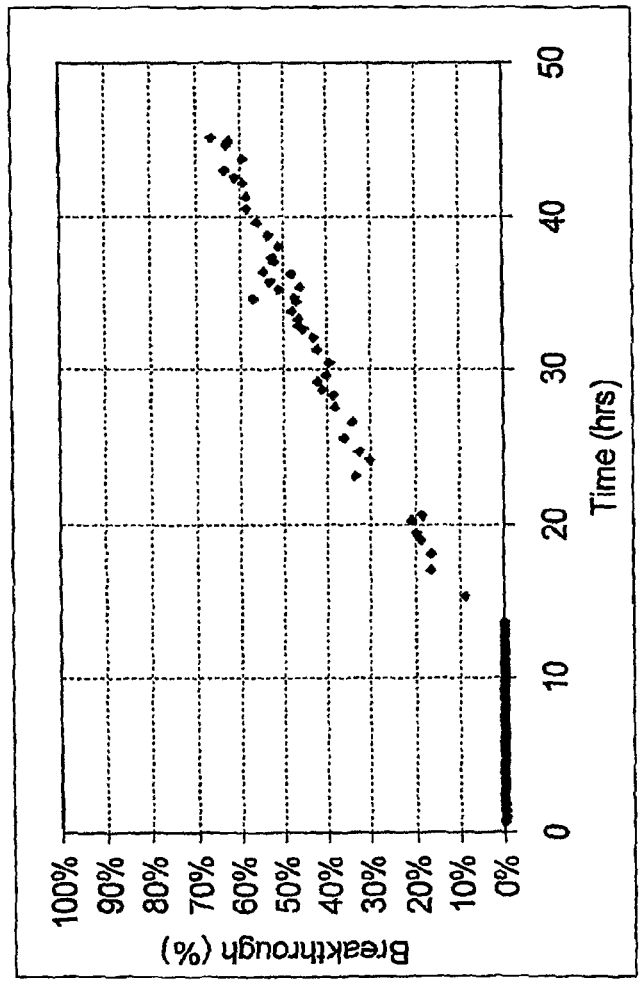
FIG. 8 shows the breakthrough curve for the adsorption of Octamethylcyclotetrasiloxane by Kynol felt ACN 211-15.

FIG. 8 shows the capacity of the Kynol ACN 211-15 adsorbent device 12 to remove 120 ppb of Octamethylcyclotetrasiloxane (OMCTS) from an air stream at 45% relative humidity.

Figure 9:
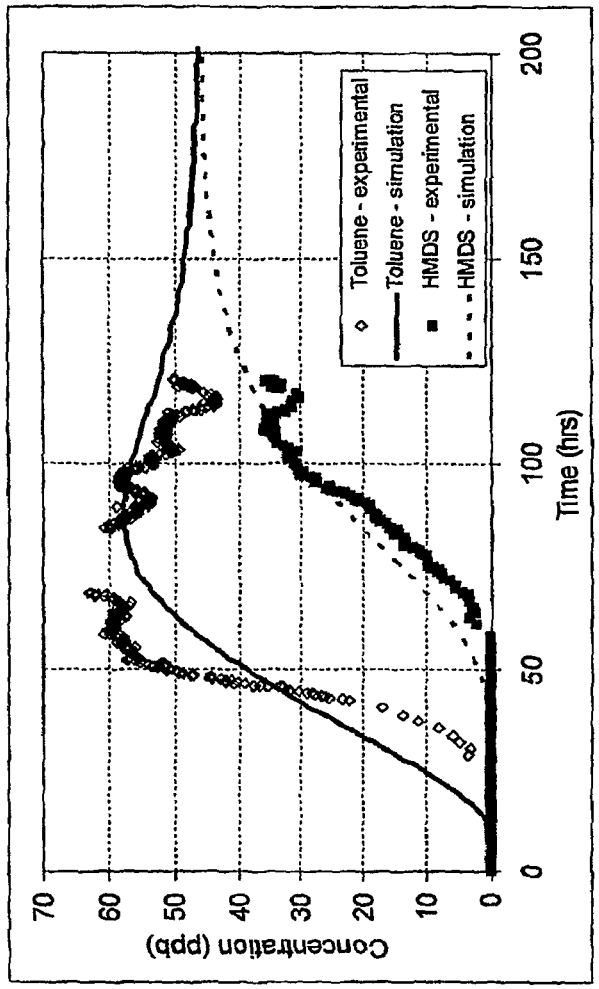
FIG. 9 shows the concentration in parts per billion (ppb) of HMDS and Toluene that is adsorbed by Kynol felt ACN 211-15.

FIG. 9 shows the concentration of Toluene and HMDS present in the airstream after the Kynol ACN 211-15 adsorbent device 12 has been used for a given number of hours.

Figure 10:
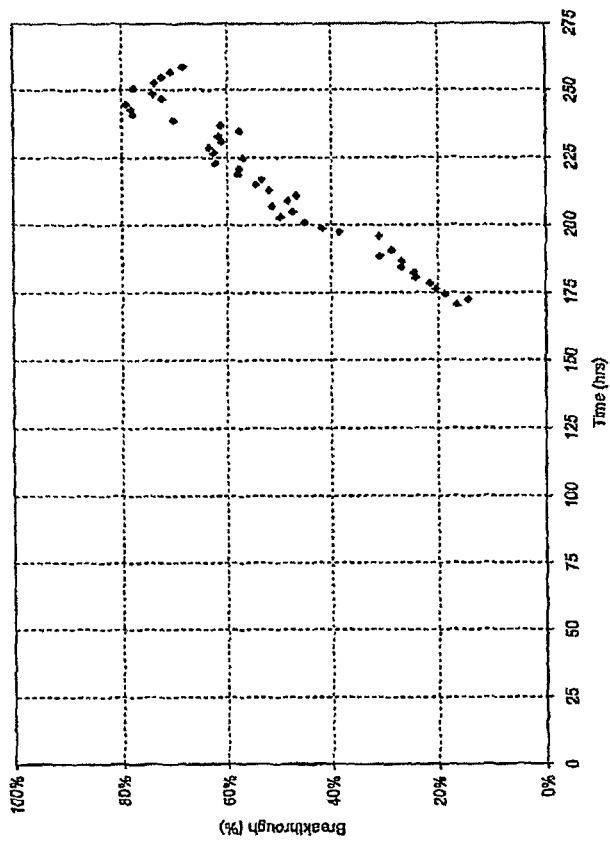
FIG. 10 shows the breakthrough curve for the adsorption of HMDS by Ahlstrom Trinitex K808-500 and Kynol felt ACN 211-15.

In another exemplary embodiment, adsorbent device 12 comprises a filter using both Ahlstrom Trinitex K808-500 and Kynol felt ACN 211-15. FIG. 10 shows the percentage of 50 ppb HMDS contaminants that breakthrough such an adsorbent device 12 over a given period of time at 40% relative humidity.

A byproduct from the photocatalysis of Cl containing contaminants (e.g., chlorobenzene) is HCl. Advantageously, adsorbent device 12 having impregnated activated carbon will selectively remove acid constituents from the fluid stream 16.

Contaminant removal system 10 can be applied to air handling systems to convert VOCs to harmless compounds. Advantageously, contaminant removal system 10 will be able to remove contaminants that prior-art devices are not able to remove, such as organic compounds containing heteroatoms siloxanes, silanes, and compounds that may deactivate the catalyst of catalytic reactor 14. For example, in environments where contaminants are present that may deactivate the photocatalyst of catalytic reactor 14, either reversibly or irreversibly, contaminant removal system 10 preferably includes at least one adsorbent device 12 upstream of the catalytic reactor 14. Similarly, if the photocatalytic reaction occurring within the catalytic reactor 14 generates a product with the potential to deactivate the catalyst, contaminant removal system 10 preferably includes at least one adsorbent device 12 located upstream of catalytic reactor 14.

In one embodiment, the catalysts used in the catalytic reactor are designed to be resistant to deactivation. For example, the catalyst can be a suitable doped titanium dioxide, or the catalyst can be selected from the group consisting of titanium dioxide, zinc oxide and tin oxide, or having crystallites of less than 14 nanometers in diameter and at least 200 $m^2$ surface area/$cm^3$ of skeletal volume in cylindrical pores of 6 nanometers in diameter or larger, or having an overlayer that is UV transparent and has an interconnected pore network that allows a portion of VOC species to pass through the overlayer but at least retards another portion from passing through the overlayer.

Adsorbents devices 12 that can be used upstream of catalytic reactor 14 include impregnated and non-impregnated activated carbons, polymorphous porous graphites, clays, silicas, natural and synthetic zeolites, mesoporous zeolites, such as MCM-41, and hydrophobic adsorbents such as silicalite.

If neither the contaminant in fluid stream 16 itself nor its reaction products deactivate the catalyst in catalytic reactor 14, but the reaction products resulting from catalytic reactor 14 are undesired, adsorbent devices 12 may be placed downstream of the catalytic reactor 14 to remove these reaction products from the fluid stream 16. As shown in FIG. 1, one or more adsorbent devices 12 may be placed both upstream and downstream of catalytic reactor 14.

In one embodiment, adsorbent device 12 is placed downstream of the catalytic reactor 14. Adsorbent device 12 placed downstream of the catalytic reactor may include any of the materials recited above for use in the upstream adsorbent device.

In addition, solid reactants such as oxides, hydroxides, oxidizers or complexing agents can be used both upstream and down stream of catalytic reactor 14. The solid reactants are used to remove any acidic oxidation products and can be configured as packed beds, as microparticles embedded in pleated filters, or as coatings in monolithic structures. Microparticles embedded in pleated filters will minimize the pressure drop in contaminant removal system 10.

Some non-targeted contaminants or their oxidation products can also be eliminated through heterogeneous catalytic reactions (non photo-activated). In this case the adsorbent device 12 and the catalytic reactor 14 could be integrated together to serve both functions, by mixing the solid reactant or catalyst with the adsorbent material and applying them to the support structure, for example a honeycomb structure, or by applying them independently as layers on the support structure.

Alternatively, other materials can be used in adsorbent device 12, both upstream and downstream of the catalytic reactor 14. For example, adsorbent device 12 can include catalysts to carry out alternative oxidation reactions that can be of the metal supported type, including palladium (Pd) and/or platinum (Pt) on alumina, and manganese oxide. In this case, either packed beds or monolithic structures can be used. In low humidity air streams, a hopcalite type catalyst, which is a mixture of manganese oxide (MnO) and copper oxide (CuO) can also be used.

Figure 11:
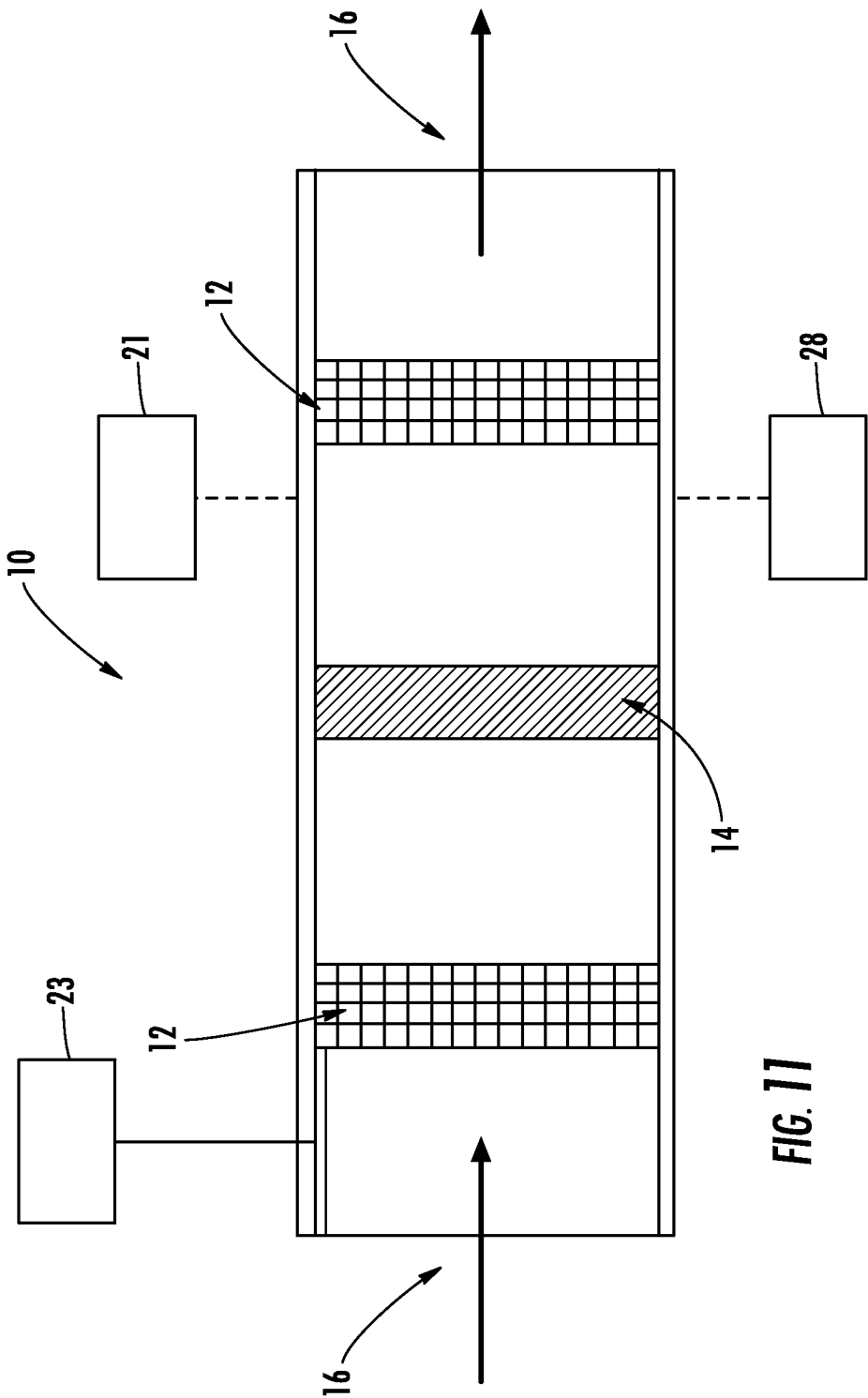
FIG. 11 is a block diagram schematically illustrating a contaminant removal system having a regeneration sensor and a heating device.

As shown in FIG. 11, system 10 may include regeneration sensor 21. Adsorption material of adsorbent devices 12 may be advanced, replaced or regenerated at prescribed times or in response to sensor 21. In one embodiment, the adsorbent material of adsorbent devices 12 is in the form of a filter or fabric, and this fabric may be pleated or otherwise formed to increase its effect by increasing the area through which the flow of the fluid is directed. This filter medium, typically installed as a roll or cartridge, is advanced or renewed at either a set interval or in response to sensor 21 such that sufficient active area is always presented to the fluid stream. Sensor 21 determines when the adsorbent material must be replaced or renewed. FIG. 11 also depicts system 10 as having a water source 23 for adding water to chemically bind the first adsorbent and the catalyst deactivating agents.

In one embodiment, the activated carbons or other materials used in adsorbent devices 12 are replaced at prescribed times when the adsorbent capacity of the devices is exceeded.

Alternatively, adsorbent devices 12 can be regenerated in-situ using an adsorption/desorption cycle. Adsorbents can be regenerated by temperature, pressure, or concentration swings.

In one exemplary embodiment, regeneration is performed overnight. This method of regeneration is ideal for applications involving commercial buildings or schools, since the heating ventilation and air conditioning (HVAC) systems in such buildings are routinely turned off at night when there is no need to supply clean air.

Another method of regeneration involves using two adsorbent devices 12 operating out of phase so that while one device is purifying the air stream entering the building, the other device is being regenerated.

Temperature swings for regeneration can be achieved using heating device 28 that generates electrical current, microwaves, infrared waves, or any other suitable heat source. In one embodiment, regeneration is accomplished using a change in pressure. This embodiment is particularly well adapted for use in airplanes, where a vacuum at high altitude can accomplish the needed pressure swing.

Figure 12:
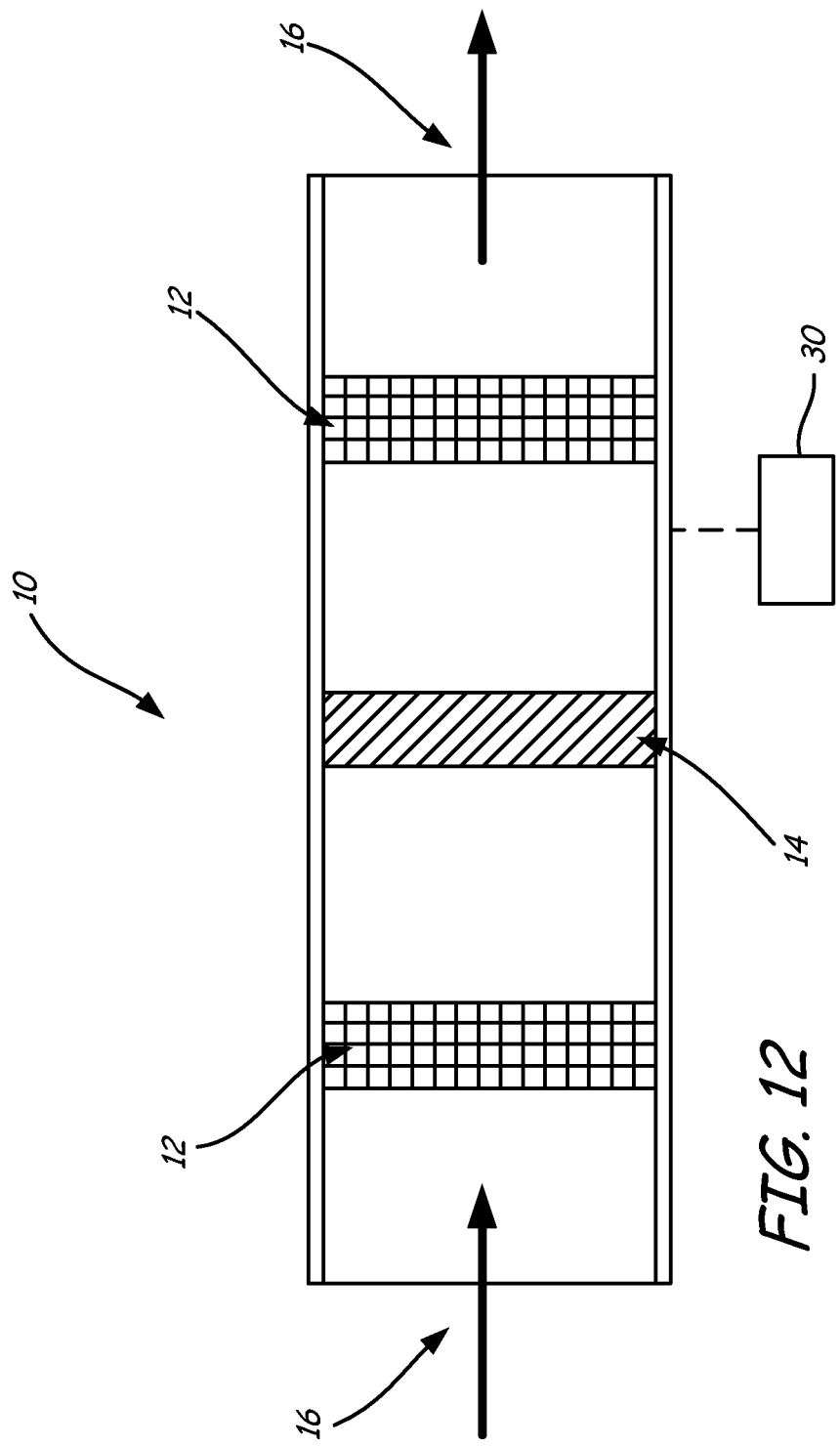
FIG. 12 is a block diagram schematically illustrating a contaminant removal system having humidity sensor.

As illustrated in FIG. 12, humidity sensor 30 may be used in conjunction with this invention such that if the humidity is too low to effectively trap the silicon, then water is added to a fluid stream or more specifically, an air stream. If the fluid is too dry, other adjustments are made to ensure that there is sufficient but not excessive moisture in the fluid to affect the hydrolysis of the organo-silicon compound if the chemical binding of the silicon containing portion of the organo-silicon compound requires water.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. It is intended that the present disclosure not be limited to the particular embodiment(s) disclosed as the best mode contemplated, but that the disclosure will include all embodiments falling within the scope of the appended claims.

What is claimed is:

1. A method for removing volatile organic compounds from an air stream, the method comprising:
    passing an air stream through first adsorbent device comprising an adsorbent material to remove deactivating agents capable of deactivating a catalyst of the type used to remove contaminants from the air stream by forming chemical bonds with the deactivating agents, wherein the deactivating agents are selected from the group consisting of siloxanes, silanes, other silicon containing volatile or semi-volatile compounds, nitrogen containing volatile or semi-volatile compounds, phosphorus containing volatile or semi-volatile compounds, sulfur containing volatile or semi-volatile compounds, and any combination thereof;
    adding water to the air stream to chemically bind the adsorbent material and the catalyst deactivating agents; and
    passing the air through a catalytic reactor located downstream, with respect to a direction of the air stream, of the adsorbent device to remove contaminants from the air stream.

2. The method of claim 1, further comprising passing the air stream through a second adsorbent device located downstream, with respect to the direction of the air stream, of the catalytic reactor to remove undesirable byproducts that may be generated when the catalytic reactor removes contaminants from the air stream.

3. A contaminant removal system for selectively removing contaminants from an air stream, the contaminant removal system comprising:
    a catalytic reactor having a catalyst therein, the catalytic reactor being configured to remove contaminants from the air stream;
    an adsorbent device having an adsorbent material therein, the adsorbent device positioned upstream, with respect to a direction of the air stream, of the catalytic reactor and configured to remove catalyst deactivating agents from the air stream by forming chemical bonds to the deactivating agents, wherein the deactivating agents are selected from the group consisting of siloxanes silanes, other silicon containing volatile or semi-volatile compounds, nitrogen containing volatile or semi-volatile compounds, phosphorus containing volatile or semi-volatile compounds, sulfur containing volatile or semi-volatile compounds, and any combination thereof; and
a water source for adding water to the air stream to chemically bind the adsorbent material and the catalyst deactivating agents.

4. The contaminant removal system of claim 3, and further comprising a second adsorbent device having an adsorbent material therein, the second adsorbent device positioned downstream, with respect to the direction of the air stream, of the catalytic reactor and being configured to remove undesirable byproducts that may be generated when the catalytic reactor removes contaminants from the air stream.

5. The contaminant removal system of claim 3, wherein the catalyst in the catalytic reactor is deposited on a honeycomb structure having a plurality of cells.

6. The contaminant removal system of claim 3, wherein the catalyst in the catalytic reactor is resistant to deactivation.

7. The contaminant removal system of claim 3, wherein the first adsorbent device comprises a catalyst.

8. The contaminant removal system of claim 3, wherein the first adsorbent device comprises a solid reactant.

9. The contaminant removal system of claim 8, wherein the configuration of the solid reactants is selected from the group consisting of packed beds, microparticles embedded in pleated filters, coatings in monolithic structures, and any combinations thereof.

10. The contaminant removal system of claim 3, and further comprising a sensor that determines when the adsorbent material must be replaced or renewed or when a roll of adsorbent material must be advanced.

11. The contaminant removal system of claim 3, wherein the first adsorbent device is replaced when an adsorbent capacity of the device is exceeded.

12. The contaminant removal system of claim 3, and further comprising means for regenerating the first adsorbent device in-situ.

13. The contaminant removal system of claim 12, wherein the means for regenerating comprises a heating device.

14. The contaminant removal device of claim 13, wherein the heating device comprises a device selected from the group consisting of an electrical current device, a microwave device, an infrared wave generating device, and any combinations thereof.

15. The contaminant removal system of claim 3, wherein a catalyst and the adsorbent material are mixed and applied to a support material.

16. The contaminant removal system of claim 3, wherein a catalyst and the adsorbent material are applied individually as layers on a support structure.

17. The contaminant removal system of claim 3, wherein a solid reactant and the adsorbent material are mixed and applied to a support material.

18. The contaminant removal system of claim 3, wherein a solid reactant and the adsorbent material are applied individually as layers on a support structure.

* * * * *